Patented Jan. 27, 1948

2,435,098

UNITED STATES PATENT OFFICE 2,435,098

MATERIAL MOVING MECHANISM

Stephen S. Pokorny, Rutland, Iowa, assignor of one-half to Herman Luebbers, Fort Dodge, Iowa Application November 9, 1945, Serial No. 627,600

5 Claims. (Cl. 214—140)

The present invention relates to the material handling and moving art and has particular reference to that portion thereof which includes mechanism which may be attached to and removed from any one of several different makes of tractors.

It is an object of the invention to provide a mechanism for attachment to a tractor whereby the motion of the power-take-off-shaft of the tractor may be applied for raising and transporting loads of material, scooped up during forward movement of the tractor, more efficiently, for several different purposes, than heretofore.

Another object of the invention is to provide a mechanism for the above stated purposes which elevates material higher and more rapidly than heretofore.

A further object of the invention is to provide a cable winding mechanism and tackle which provides more leverage, in a novel and useful manner, at the start of a load-raising operation than heretofore.

A particular object of the invention is to provide a mechanism for the above stated purposes, the parts of which, when assembled in combination with a tractor and in a normal position, do not extend above the top of the engine or any portion of the said tractor, whereby the vehicle and the new mechanism, while attached thereto, may be driven through comparatively low doorway openings of sheds, barns and the like and without a removal of the new mechanism from said tractor.

Other and further objects and advantages of the invention will be understood from the following detailed description thereof.

Figure 2:
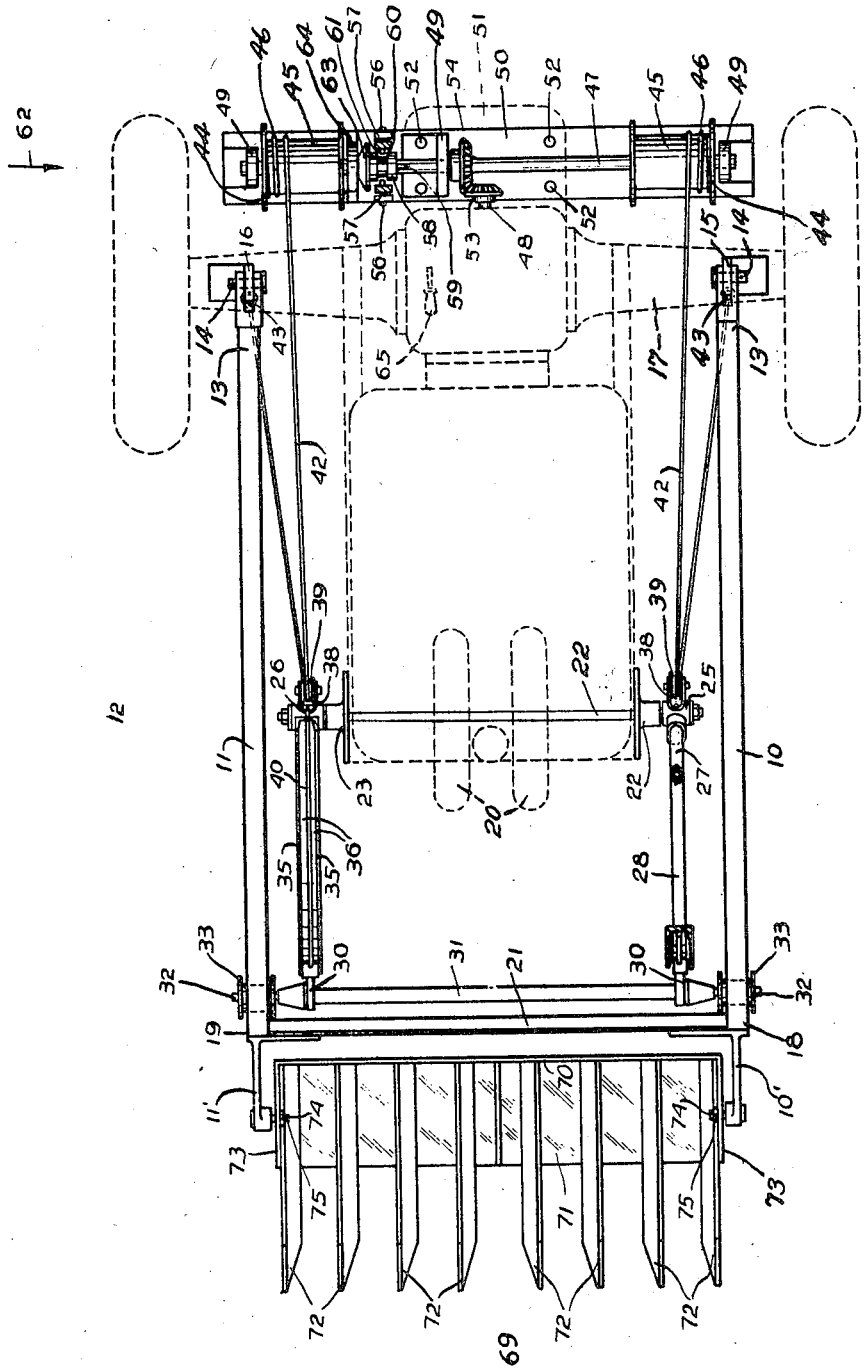
Figure 2 is a top plan view of the mechanism shown in Figure 1, certain portions thereof being shown in section, the view being taken substantially on line 2—2 of Figure 1.
Figure 3:
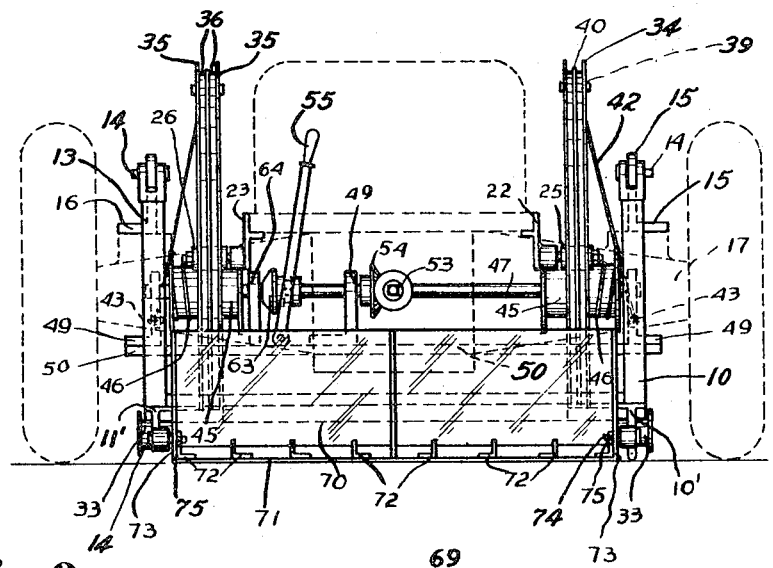
Figure 3 is a front elevation of the new device shown in Figure 1.

Referring to the drawings for a more particular description and first to Figure 2, the present invention includes two like rails 10 and 11 which are oppositely disposed respectively at the sides of the tractor, the latter being indicated generally at 12. The tractor is illustrated by dotted lines throughout the several views since said tractor may be of any one of several conventional types and therefore believed not to require any particular description or illustration herein.

The ends 13 of the rails 10 and 11 are pivotally mounted on pivot pins, as at 14, having their ends bifurcated in a manner whereby the forks at the ends of the rails are disposed at each side of C-shaped supports 15 and 16 respectively.

Figure 1:
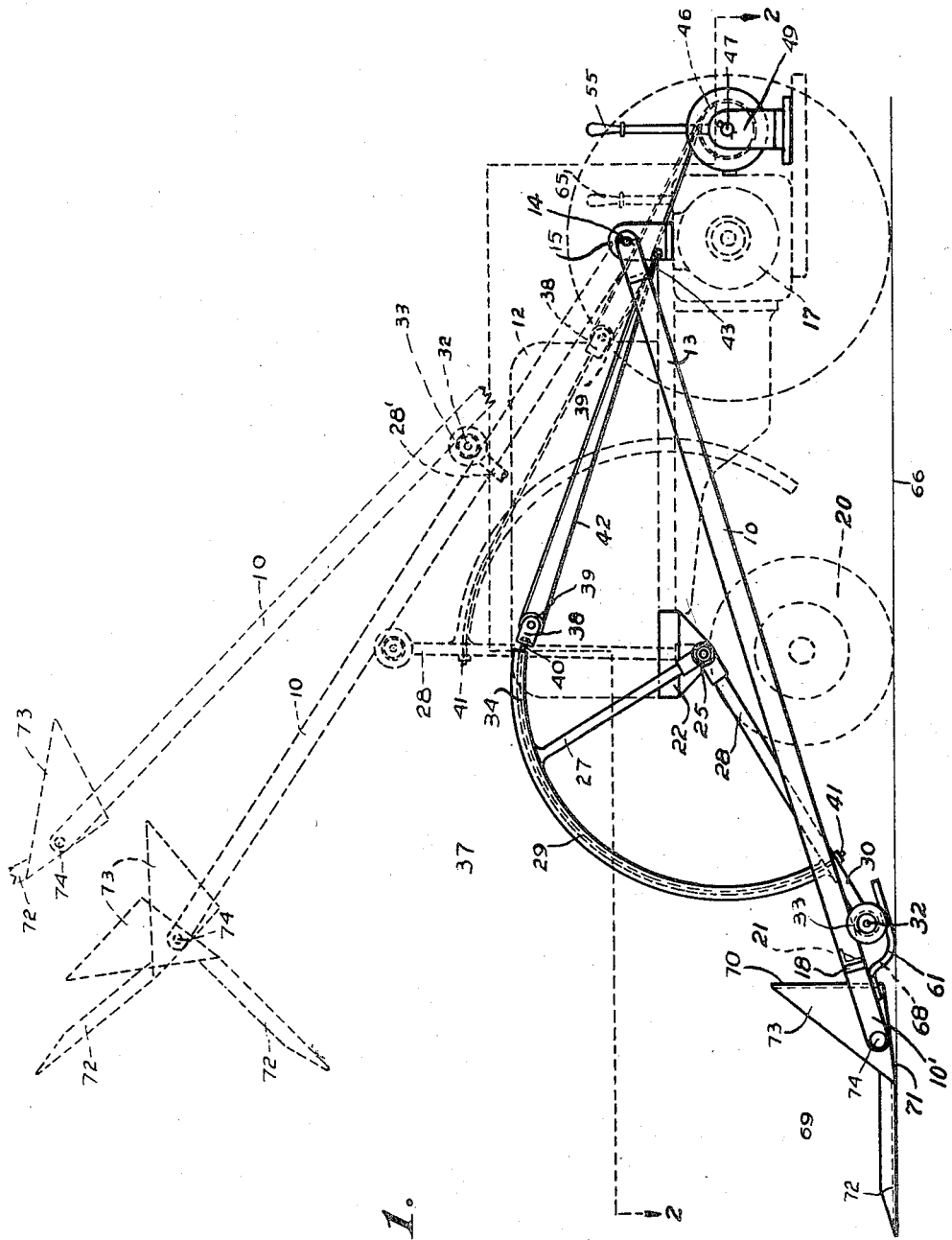
Figure 1 is a side view of the new mechanism attached in an operative position to a tractor, the latter being represented by dotted lines, the said mechanism being in a lowered scooping position and also illustrating the said mechanism in a raised position by means of dotted lines.

As best shown in Figure 1, the supports 15 and 16 are provided with footings which are secured by any suitable means such as bolts, welding or the like, not shown, to the rear axle housing 17 of the tractor 12, and it will be understood that, if desired, the rearwardly disposed ends 13 of the rails 10 and 11 may be pivotally attached respectively to the rear axle housing 17 of the tractor by any suitable means for vertical swinging movements.

The other ends of the rails, indicated at 18 and 19 respectively, each extends, as best shown in Figures 1 and 2, forwardly of the front steering wheels 20 of the tractor, being secured together by means of a cross-bar 21, the latter having its ends respectively secured to the rails.

As best shown in Figures 1 and 2, oppositely disposed hanger-brackets or trunnion-plates 22 and 23 are respectively secured to opposite sides of the frame of the tractor 12. Any suitable means is employed for securing the hanger-brackets to the frame of the tractor and preferably bolts, not shown, are utilized, whereby said hanger-brackets may be readily attached to and removed from the said frame and at the time the pivot pins 14 are removed for detaching the mechanism of the present invention from the tractor 12.

A jack-shaft 24 is journaled through said hanger-brackets or trunnion-plates, as best shown in Figure 2. The shaft 24 extends outwardly beyond each hanger-bracket for purposes later described.

Between the ends of the jack-shaft 24 and the hanger-brackets, like hubs 25 and 26 are each welded or otherwise suitably secured rigidly to the shaft 24. As shown in Figure 1, from each hub, two spokes 27 and 28 are radially disposed and arcuate members 29 are secured to the outer ends of the spokes 27 and to the spokes 28 adjacent the outer or forward ends of the spokes 28. The forward ends 30 extend beyond the adjacent ends of the arcuate members 29 and at the forward ends of the portions 30, as best shown in Figure 2, a pipe-bar 31 is provided which connects said portions 30 together. Stub axles 32 extend from each end of the bar 31 for providing a pivotal mounting for flanged rollers 33.

The flanges of the rollers are respectively disposed at opposite sides of the rails 10 and 11 and underneath said rails for raising the rails at times when the spokes 28 are swung vertically upwardly as later described, said flanges prevent the rails from sliding off of their respective rollers.

The arcuate members 29 have end portions 34 which, as best shown in Figure 1, are disposed rearwardly of the spokes 27. As best shown in Figure 2, the arcuate members 29 are each provided with oppositely disposed flanges 35 which are spaced apart to provide channels 36 between said pairs of flanges. As shown in Figure 1, the rearwardly disposed ends of the arcuate members 29, together with their spokes 28, provide an outline of a sector configuration, said sectors being generally indicated at 37. The spokes 27 and 28 being radially disposed from the hubs 25 and 26 respectively constitute radii and since said hubs are locked to the jack-shaft 24, it will be seen that said sectors are arranged to swing in unison at times when the jack-shaft 24 rotates in its trunnion-plates.

A sheave-block 38 is disposed closely adjacent to the rear ends of the sectors 37, each of said blocks being provided with a pivotally mounted sheave pulley wheel 39. Ends of cables 40 are secured respectively to the blocks 38 and said cables are disposed in the channels 36 of the sectors. The forward ends of the cables 40 are dead-ended as at 41, as best shown in Figure 1, to the forward ends of the sectors and adjacent the portions 30 of the spokes 28.

Flexible strands 42 are reeved respectively over the sheave-wheels 39, having ends 43 which are secured to the rear ends of the tractor and preferably, as best shown in Figure 1, secured to the C-shaped supports 15. The other ends of the flexible strands 42 are indicated at 44, being respectively secured to the spools 45 and having portions 46 which are wound about said spools.

A spool-shaft 47 is transversely disposed with respect to the tractor and rearwardly of the power-take-off-shaft 48 of the tractor.

The spool-shaft 47 is mounted in trunnion-plates 49 and the latter are secured to a platform 50.

The platform 50 is secured to the step 51 of the tractor by any suitable means such as the stud-bolts 52 in a manner whereby the spool-shaft 47 is revolvably mounted for unitary rotary movements with respect to the spools 45 since said spools are keyed or otherwise suitably locked to the shaft 47.

A beveled pinion 53 is secured by any suitable means to the power-take-off-shaft 48 of the tractor 12 and, during use, the teeth of the pinion 53 are in mesh, at times, with the teeth of a driven pinion 54. The pinion 54 is splined or otherwise suitably locked to the spool-shaft 47 and the latter is transversely slidable in its bearings for causing the teeth of the pinion 54 to engage with the teeth of the beveled pinion 53 at desired times.

A lever 55 is provided, having a bifurcated lower end, the forks of which are pivotally attached by means of pivot pins 56 respectively to upstanding ears 57. The lower ends of the ears 57 are welded or otherwise suitably secured to the platform 50.

A sleeve 58 is slidably disposed on the spool-shaft 47 and on a key or spline 59. The latter is locked to the spool-shaft 47, whereby at times when the shaft 47 rotates, the sleeve 58 also rotates, while at the same time, the sleeve 58 may be moved longitudinally with respect to the spool-shaft.

The sleeve 58 is provided with an annular kerf 60 and the control-pins 61 extend into said kerf, said pins being secured to the forked ends respectively of the lever 55.

As thus described, it will be seen that at times when the lever 55 is moved in the direction of the arrow 62, the teeth of the pinions 53 and 54 are caused to engage for causing the power-take-off-shaft 48 to rotate the spools or winding drums 45. It will also be seen that at times when the lever 55 is moved in a direction opposite with respect to the arrow 62, the pinions 53 and 54 become disengaged and that a further movement in the said direction of the spool-shaft 47 will cause the cone 63 to be simultaneously moved in a direction opposite with respect to the arrow 62, since said cone 63 is rigidly secured to the shaft 47 and axially about said shaft. A sufficient movement of the cone 63 causes it to disengage with a face-plate 64. The face-plate is provided with a bore, the wall of which is axially disposed about the shaft 47, said wall being beveled or tapered complemental to the shape or contour of the cone 63, whereby at the time when the cone rigidly engages the face-plate 64, a braking action is provided for stopping a rotation of the spool-shaft 47 and at a time when the pinions 53 and 54 are disengaged. The lower portion of the face-plate 64 is welded or otherwise suitably secured to the platform 50.

A second lever 65 is represented in Figure 2 by means of dotted lines and it will be understood that the lever 65 is an initial part of the tractor 12 and so arranged that at the time when the lever 65 is moved in one direction, the transmission gears of the tractor are caused to drive the power-take-off-shaft 48 of said tractor and at a time when said transmission gears are driven by the crankshaft of the engine and the latter is operating.

During operation, the lever 55 is moved in the direction of the arrow 62 to cause an engagement of the pinions 53 and 54, whereupon the lever 65 of the tractor is manipulated for causing the power-take-off-shaft to be rotated for correspondingly rotating the spools 45.

At the time when the spools 45 are rotated in one direction, adjacent portions of the flexible strands 42 are wound about the spools for drawing the sheave-blocks towards the rear end of the tractor and for swinging the sectors 35 correspondingly and from the full line position of the latter, as shown in Figure 1, to the dotted line position as shown in said figure.

At the time the radial spokes 28 are moved from their lower full line position, as shown in Figure 1, to a vertical position, as shown by dotted lines in said figure, the rails 10 and 11 are moved upwardly, swinging on their pivot pins 14, to an angle which is approximately forty-five degrees with respect to a horizontal position and with respect to the surface 66 of the ground upon which the wheels of the tractor are supported.

At times when the flexible strands are further wound about their respective spools 45, the spokes 28 are further moved toward the rear end of the tractor and to the dotted line position thereof, indicated at 28' in Figure 1, for further elevating the forward ends of the rails 10 and 11.

At times when it is desired to lower said rails the upper end of the lever 55 is moved towards the face-plate 64 for causing a disengagement of the pinions 53 and 54, whereupon the forward ends of the rails 10 and 11 become lowered by operation of gravity and a downward movement of said rails may be checked or controlled by causing the cone-clutch 61 to cooperate with the face-plate 64 for said purpose.

Detents or stops 67 are provided having forwardly disposed end portions 68 which are secured to the underneath side of the rails 10 and 11 respectively. At times when the rails 10 and 11 are lowered to the position shown in Figure 1, the flanged rollers 33 do not strike said detents. Assuming that the mechanism is operating upon uneven ground and that there is a trench or the like in front of the steering wheels 20 of the tractor and that the forward ends of the rails 10 and 11 become lowered below the surface of the soil and into said trench, furrow or the like, then in that event, the detent 67 prevents too great a forward movement of the rollers 33 with respect to their respective rails, whereby the rollers 33 are always disposed operatively and in engagement with the underneath sides of their respective rails for raising said rails as above described.

Between the forward ends of the rails 10 and 11, a scoop, generally indicated at 69, is provided. The scoop has a rearward wall 70 and a bottom 71. If desired, tines 72 may be employed in conjunction with the scoop, being secured to the bottom 71.

The scoop further includes oppositely disposed side walls 73. Stub axles 74 are disposed through the walls 73 respectively and provided with nuts 75. The axles 74 extend through the forward ends of the rails 10 and 11 respectively and, as thus described, it will be understood that at times when the nuts 75 are turned tightly and sufficiently against the side wall 73 of the scoop, the latter becomes locked with respect to the rails as is essential or advantageous for certain types of work such as elevating bales of hay upwardly for entrance through the door of and storage in a loft, since for this purpose, the scoop 69 need not be swingable with respect to the rails.

For other types of work, the scoop 69 is disposed swingable with respect to said rails 10 and 11 or their respective extensions 10' and 11' by loosening the nuts 75 and, at this time, an arrangement of levers, reach-rods and links, not shown, is employed for holding the scoop in different positions with respect to the rails for other types of work and, since the scoop 69 may be employed either with or without locking it to the rails 10 and 11, no illustration or particular description of the control links and levers for the scoop is believed to be needed.

From the foregoing description, it is thought to be obvious that a material moving mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

1. A material moving mechanism comprising a tractor having a power-take-off-shaft arranged to be rotated by the engine of the tractor; a trunnion plate secured at each side of and to the forward end of said tractor; a jack-shaft rotatably carried by said plates; a sector at each side of said tractor secured to the ends of said jack-shaft adjacent the junction of their radii for unitary vertical swinging movements, the arcs of said sectors being each provided with a channel; an arm at each side of the tractor having ends pivotally attached to the rear end of said tractor, the other ends of said arms being normally disposed forwardly of the tractor and said sectors; a scoop disposed between said forward ends of the arms; detents secured to the arms adjacent said forward ends; a cable disposed in each channel, ends of said cables being secured to the forward ends of said sectors; two sheave-blocks, the other ends of said cables being attached to said blocks respectively; a flexible strand reeved over the sheave of each block having ends secured to the rear end of said tractor; a spool-shaft rotatably disposed transversely at the rear end of said tractor and having a spool at each of its ends; the other ends of said flexible strands being respectively secured to a spool; a roller pivotally attached to the forward end of each sector; said rollers being arranged to abut said detents for preventing said arms from becoming lowered unduly, said rollers being disposed against said arms for elevating the forward ends thereof at times when said sectors are swung; and means for causing the said power-take-off-shaft of the tractor to rotate said spool-shaft for causing said scoop to become elevated.

2. In a material moving mechanism, a tractor having a power-take-off-shaft arranged to be rotated by the engine of the tractor, an arm disposed at each side of said tractor having ends pivotally connected to the rear end of said tractor for vertical swinging movements, the other ends of said arms normally being disposed forwardly of said tractor; a scoop disposed between said forward ends of said arms; a sector disposed at each side of said tractor, said sectors each having a pivotal connection, at the junction of their respective radii, to the forward end of said tractor for vertical swinging movement, the arcuate edges of said sectors each being provided with a channel; a roller pivotally secured adjacent to one end of the arc of each sector, said rollers being disposed in engagement with said arms for elevating said scoop at times when said sectors are swung; a sheave-block for each sector, said blocks being disposed at the opposite ends of the arcs of said sectors with respect to the rollers thereof; a cable disposed in each channel; said cables having ends secured to said sectors adjacent the rollers of the latter and opposite ends attached to said blocks respectively; a flexible strand for each block, said strands being reeved over said sheaves and having ends attached to the rear end of said tractor and other ends; and means arranged to be actuated by said power-take-off-shaft of said tractor having a connection with said other ends of said strands for causing said sectors to swing responsive to an actuation of said means.

3. In a material moving mechanism as claimed in claim 2 which is so constructed and the parts thereof are so cooperatively arranged with respect to each other that none of said parts are disposed above the tractor at the time the arms thereof are disposed in approximate parallelism with the frame of said tractor, for permitting the tractor to move through a doorway opening having a head jamb no higher, with respect to the ground, than said tractor.

4. In a material moving mechanism for a tractor; an arm having an end adapted to be pivotally connected to the rear end of said tractor and an end disposed forwardly of said tractor when so connected; a sector adapted to be pivotally connected, adjacent the junction of its radii, to the forward end of said tractor for vertical swinging movement, the arcuate edge of said sector being provided with a channel; a cable dead-ended to one end of said edge and disposed in said channel; a sheave-block attached to the other end of said cable and disposed at the other end of said arc; a flexible strand reeved over the sheave of said block; and means for causing the engine of said tractor to move said strand for swinging said sector toward the rear end of said tractor, said sector being provided with a roller pivotally attached thereto for a rolling engagement with said arm for causing the latter to swing correspondingly.

5. In a material moving mechanism for a tractor; an arm having an end adapted to be pivotally connected to the rear end of said tractor and an end disposed forwardly of said tractor when so connected; a sector adapted to be pivotally connected, adjacent the junction of its radii, to the forward end of said tractor for vertical swinging movement, the arcuate edge of said sector being provided with a channel; a cable dead-ended to one end of said edge and disposed in said channel; and means for causing the engine of said tractor to move said cable for swinging said sector toward the rear end of said tractor, said sector being provided with a roller pivotally attached thereto for a rolling engagement with said arm for causing the latter to swing correspondingly.

STEPHEN S. POKORNY.

REFERENCES CITED

The following references are of record in the file of this patent:

UNITED STATES PATENTS

| Number | Name | Date |
|---|---|---|
| 206,023 | Johnson | July 16, 1878 |
| 1,360,997 | Armstrong | Dec. 7, 1920 |
| 2,286,947 | Bankson | June 16, 1942 |
| 2,313,534 | Gledhill | Mar. 9, 1943 |
| 2,322,472 | Sandvig | June 22, 1942 |
| 2,371,273 | Walker | Mar. 13, 1945 |
| 2,402,064 | Markel | June 11, 1946 |
| 2,415,892 | Koehl et al. | Feb. 18, 1947 |